United States Patent
Guan et al.

(10) Patent No.: US 9,407,412 B2
(45) Date of Patent: Aug. 2, 2016

(54) METHOD, APPARATUS AND SYSTEM FOR RECEIVING AND SENDING SCHEDULING INFORMATION

(71) Applicant: HUAWEI TECHNOLOGIES CO., LTD., Shenzhen, Guangdong (CN)

(72) Inventors: Lei Guan, Beijing (CN); Yongxia Lv, Beijing (CN); Chaojun Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 228 days.

(21) Appl. No.: 14/094,022

(22) Filed: Dec. 2, 2013

(65) Prior Publication Data
US 2014/0086184 A1    Mar. 27, 2014

Related U.S. Application Data

(63) Continuation of application No. PCT/CN2012/076449, filed on Jun. 4, 2012.

(30) Foreign Application Priority Data

Jun. 2, 2011   (CN) .......................... 2011 1 0147736

(51) Int. Cl.
*H04L 5/00*  (2006.01)
*H04W 72/12* (2009.01)

(52) U.S. Cl.
CPC .............. *H04L 5/0053* (2013.01); *H04L 5/001* (2013.01); *H04W 72/1289* (2013.01); *H04L 5/0055* (2013.01)

(58) Field of Classification Search
CPC .............................. H04L 5/0053; H04W 72/04
See application file for complete search history.

(56) References Cited

U.S. PATENT DOCUMENTS

| | | | |
|---|---|---|---|
| 2010/0232373 A1* | 9/2010 | Nory ................. | H04W 72/1289 370/329 |
| 2011/0076962 A1* | 3/2011 | Chen ....................... | H04L 5/001 455/68 |

(Continued)

FOREIGN PATENT DOCUMENTS

| | | |
|---|---|---|
| CN | 101505498 | 8/2009 |
| WO | 2011/019009 A1 | 2/2011 |

(Continued)

OTHER PUBLICATIONS

International Search Report, dated Sep. 6, 2012, in corresponding International Application No. PCT/CN2012/076449 (4 pp.).

(Continued)

*Primary Examiner* — Rasheed Gidado
(74) *Attorney, Agent, or Firm* — Staas & Halsey LLP

(57) ABSTRACT

The present invention discloses a method and a terminal for receiving and sending scheduling information, and relates to the field of communications technologies. The method comprises: obtaining, by a terminal, transmission mode information of each carrier of N carriers configured by a network device, where N is a natural number greater than 1; determining a set of candidate downlink control information DCI formats according to the transmission mode information, where the set of candidate DCI formats includes at least a first DCI format and a second DCI format, where a physical downlink control channel PDCCH corresponding to the first DCI format carries scheduling information of at least two carriers of the N carriers, and a PDCCH corresponding to the second DCI format carries scheduling information of one carrier of the N carriers; and receiving and detecting a PDCCH corresponding to each DCI format in the set of candidate DCI formats.

16 Claims, 4 Drawing Sheets

(56) References Cited

U.S. PATENT DOCUMENTS

| | | | |
|---|---|---|---|
| 2011/0228863 A1* | 9/2011 | Papasakellariou | H04L 1/0031 375/259 |
| 2011/0269492 A1* | 11/2011 | Wang | H04L 5/003 455/509 |
| 2011/0292891 A1* | 12/2011 | Hsieh | H04L 5/001 370/329 |
| 2012/0009923 A1* | 1/2012 | Chen | H04L 5/0091 455/434 |
| 2012/0033627 A1* | 2/2012 | Li | H04L 5/0007 370/329 |
| 2012/0044899 A1* | 2/2012 | Kwon | H04L 5/001 370/329 |
| 2012/0140727 A1* | 6/2012 | Ng | H04W 72/042 370/329 |
| 2013/0016655 A1* | 1/2013 | Heo | H04L 5/001 370/328 |

FOREIGN PATENT DOCUMENTS

| | | |
|---|---|---|
| WO | 2011/053851 A2 | 5/2011 |
| WO | 2011/053856 A2 | 5/2011 |

OTHER PUBLICATIONS

*PDCCH Structure for LTE-Advanced System*, TSG-RAN WG1#57, R1-091692, San Francisco, CA, USA, May 4-8, 2009, pp. 1-8.
International Search Report and Written Opinion, dated Sep. 6, 2012, in corresponding International Application No. PCT/CN2012/076449 (12 pp.).
Extended European Search Report issued Apr. 2, 2014, in corresponding European Patent Application No. 12793005.5.
Chinese Office Action dated Jun. 17, 2015 in corresponding Chinese Patent Application No. 201280003787.6.

* cited by examiner

METHOD, APPARATUS AND SYSTEM FOR RECEIVING AND SENDING SCHEDULING INFORMATION

CROSS-REFERENCE TO RELATED APPLICATIONS

This application is a continuation of International Application No. PCT/CN2012/076449, filed on Jun. 4, 2012, which claims priority to Chinese Patent Application No. 201110147736.8, filed on Jun. 2, 2011, both of which are hereby incorporated by reference in their entireties.

TECHNICAL FIELD

The present invention relates to the field of communications technologies, and in particular, to a method, an apparatus, and a system for receiving and sending scheduling information.

BACKGROUND

With development of the LIE (Long Term Evolution, Long Term Evolution) technology, CA (Carrier Aggregation, carrier aggregation) is introduced into the existing LTE system, where resources of multiple CCs (Component Carriers, component carriers) may be simultaneously scheduled for a UE (User Equipment, user equipment) to use, so as to provide higher peak rates and fulfill higher service requirements. For PDCCH (Physical Downlink Control Channel, physical downlink control channel) transmission in a CA system, one practice is to encode control information of multiple carriers independently to generate multiple independent PDCCHs; and another practice is to encode control information of multiple carriers jointly, that is, multiple carriers are scheduled by using a joint PDCCH, where the joint coding may reduce signaling overhead of the PDCCH by sharing certain control information between carriers. For example, a jointly coded PDCCH requires only a 16-bit CRC (Cyclical Redundancy Check, cyclic redundancy check).

In the prior art, carriers are mostly scheduled by means of joint coding. Specifically, a base station configures N carriers for a terminal, where N is a natural number greater than 1; the terminal and the base station each determine a DCI format set according to transmission mode information of the N carriers configured by the base station, where the DCI format set includes multiple DCI formats, the PDCCH corresponding to each DCI format carries scheduling information of N carriers. In addition, search space is determined according to a candidate format set. The base station transmits a PDCCH in the search space, and the terminal receives the PDCCH also in the search space.

After analyzing the prior art, the inventor finds that the prior art has at least the following disadvantages: where joint coding is applied, if the UE reserves a payload size for all carriers configured for the UE but the base station schedules only one carrier or only a part of the carriers to the UE at a time point, the UE may fill the PDCCH with null bits for the scheduling information corresponding to unscheduled carriers, which leads to waste of overhead.

SUMMARY

To solve the problem of overhead waste in the prior art, embodiments of the present invention provide a method, an apparatus, and a system for receiving and sending scheduling information. The technical solutions are as follows:

In one aspect, a method for receiving scheduling information is provided, including:

obtaining, by a terminal, transmission mode information of each carrier of N carriers configured by a network device for the terminal, where N is a natural number greater than 1;

determining a set of candidate downlink control information DCI formats according to the transmission mode information, where the set of candidate DCI formats includes at least a first DCI format and a second DCI format, where a physical downlink control channel PDCCH corresponding to the first DCI format carries scheduling information of at least two carriers of the N carriers, and a PDCCH corresponding to the second DCI format carries scheduling information of one carrier of the N carriers; and receiving and detecting a PDCCH corresponding to each DCI format in the set of candidate DCI formats, or a specified DCI format indicated by the network device among the set of candidate DCI formats.

In another aspect, a terminal is provided, including:

an obtaining module, configured to obtain transmission mode information of each carrier of N carriers configured by a network device for the terminal, where N is a natural number greater than 1;

a determining module, configured to determine a set of candidate downlink control information DCI formats according to the transmission mode information, where the set of candidate DCI formats includes at least a first DCI format and a second DCI format, where a physical downlink control channel PDCCH corresponding to the first DCI format carries scheduling information of at least two carriers of the N carriers, and a PDCCH corresponding to the second DCI format carries scheduling information of one carrier of the N carriers; and a receiving module, configured to receive and detect a PDCCH corresponding to each DCI format in the set of candidate DCI formats, or a specified DCI format indicated by the network device among the set of candidate DCI formats.

In another aspect, another method for sending scheduling information is provided, including:

obtaining, by a network device, transmission mode information of each carrier of N carriers configured for a terminal, where N is a natural number greater than 1;

determining a set of candidate downlink control information DCI formats according to the transmission mode information, where the set of candidate DCI formats includes at least a first DCI format and a second DCI format, where a physical downlink control channel PDCCH corresponding to the first DCI format carries scheduling information of at least two carriers of the N carriers, and a PDCCH corresponding to the second DCI format carries scheduling information of one carrier of the N carriers; and determining at least one DCI format in the set of candidate DCI formats of the terminal, and sending a PDCCH corresponding to the at least one DCI format to the terminal.

In another aspect, a network device is provided, including:

an obtaining module, configured to obtain transmission mode information of each carrier of N carriers configured for a terminal, where N is a natural number greater than 1;

a determining module, configured to determine a set of candidate downlink control information DCI formats according to the transmission mode information, where the set of candidate DCI formats includes at least a first DCI format and a second DCI format, where a physical downlink control channel PDCCH corresponding to the first DCI format carries scheduling information of at least two carriers of the N carriers, and a PDCCH corresponding to the second DCI format carries scheduling information of one carrier of the N carriers; and a sending module, configured to determine at least one DCI format in the set of candidate DCI formats of the terminal, and send a PDCCH corresponding to the at least one DCI format to the terminal.

In another aspect, a system for receiving and sending scheduling information is provided, where the system includes the aforesaid terminal and the aforesaid network device.

In the technical solutions provided in the embodiments of the present invention, a set of candidate DCI formats includes at least a first DCI format and a second DCI format, where the first DCI format carries jointly coded scheduling information of at least two carriers of N carriers, and the second DCI format carries separately coded scheduling information of one carrier of the N carriers. In this way, a network device schedules UEs according to PDCCHs of DCI formats in the set of candidate DCI formats. Correspondingly, a UE detects PDCCHs according to the DCI formats in the set of candidate DCI formats. Evidently, for jointly coded PDCCHs, it is not necessary to reserve a payload size according to all carriers configured for the UE, which reduces resource overhead of the PDCCHs under a PDCCH joint coding scheme and improves the scheduling flexibility.

BRIEF DESCRIPTION OF DRAWINGS

To illustrate the technical solutions in the embodiments of the present invention or in the prior art more clearly, the following briefly introduces the accompanying drawings needed for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
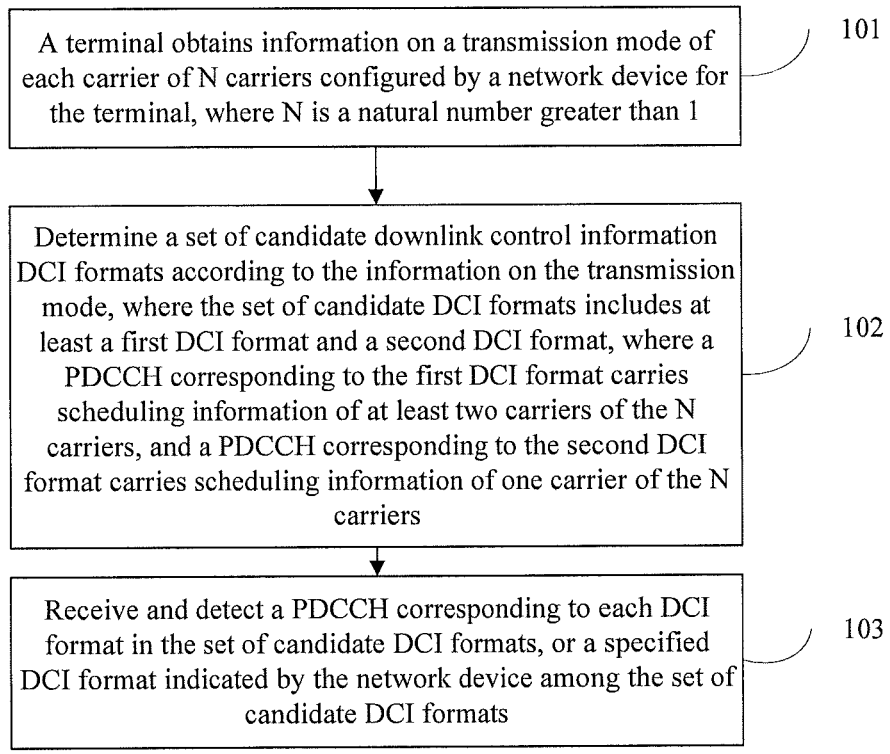
FIG. 1 is a flowchart of a method for receiving scheduling information according to an embodiment of the present invention.

To make the objectives, technical solutions, and advantages of the present invention more comprehensible, the following further describes the embodiments of the present invention in detail with reference to the accompanying drawings.

Before describing the technical solutions provided in the present invention, fundamentals related to the present invention are described briefly below.

In an LIE system, search space is a set of candidate PDCCHs, and is specifically defined according to a CCE aggregation level occupied by each PDCCH, where a CCE is a minimum unit that makes up a PDCCH. According to channel conditions, transmission may be performed by using four CCE aggregation levels (corresponding to different coding rates), namely, 1, 2, 4, and 8. Search space is categorized into common search space and UE-specific search space. The former is space that all UEs need to check. The latter is specific to each UE, and is determined by an RNTI (Radio Network Temporary Identity, radio network temporary identifier), a subframe number, and a CCE aggregation level that are specific to a UE, and the numbers of candidate PDCCHs in the search space corresponding to the four CCE aggregation levels 1, 2, 4, and 8 are 6, 6, 2, and 2, respectively. All search space in the embodiments of the present invention is UE-specific search space.

Due to differences between transmission modes or resource allocation modes, each PDCCH may have a different DCI format, such as format 0, 1A, 1B, 1C, 1D, 1, 2, 2A, 3, or 3A. The payload size generally varies between the PDCCHs of these DCI formats, but some formats such as 0, 1A, 3, and 3A have the same payload size and are distinguished by bits or scrambling codes in signaling. In an LTE system, an eNB (evolved Node B, evolved NodeB) configures one of multiple transmission modes for a UE according to RRC dedicated signaling. Under each transmission mode, the UE needs to detect the PDCCHs of DCI formats of two or three payload sizes. Among the formats, at least one type is a DCI format related to the current mode, and another type is formats DL_grant 1A and UL_grant 0 (0 and 1A have the same payload size, and are distinguished by a header in signaling) shared by all transmission modes. For example, transmission mode 3 is open-loop MIMO transmission, and corresponds to DCI format 2A, DCI format 0, and DCI format 1A; transmission mode 4 is closed-loop MIMO transmission, and corresponds to DCI format 2, DCI format 0/1A. A format (0/1A) shared between transmission modes is used in order to achieve smooth transition in a mode switching process. Moreover, when channel conditions of a UE deteriorate instantaneously, for example, when the channel level is lower, fallback formats 1A and 0 that have a small payload may be used for scheduling, so as to improve performance robustness of the PDCCH and save overhead of the PDCCH.

As shown in FIG. 1, an embodiment of the present invention provides a method for receiving scheduling information, including:

Step 101: A terminal obtains transmission mode information of each carrier of N carriers configured by a network device for the terminal, where N is a natural number greater than 1.

Step 102: Determine a set of candidate downlink control information DCI formats according to the transmission mode information, where the set of candidate DCI formats includes at least a first DCI format and a second DCI format, where a PDCCH corresponding to the first DCI format carries scheduling information of at least two carriers of the N carriers, and a PDCCH corresponding to the second DCI format carries scheduling information of one carrier of the N carriers.

Step 103: Receive and detect a PDCCH corresponding to each DCI format in the set of candidate DCI formats, or a specified DCI format indicated by the network device among the set of candidate DCI formats.

In the technical solution provided in the embodiment of the present invention, a set of candidate DCI formats includes at least a first DCI format and a second DCI format, where the first DCI format carries jointly coded scheduling information of at least two carriers of N carriers, and the second DCI format carries separately coded scheduling information of one carrier of the N carriers. In this way, a network device schedules UEs according to PDCCHs of DCI formats in the set of candidate DCI formats. Correspondingly, a UE detects PDCCHs according to the DCI formats in the set of candidate DCI formats. Evidently, for jointly coded PDCCHs, it is not necessary to reserve a payload size according to all carriers configured for the UE, which reduces resource overhead of the PDCCHs under a PDCCH joint coding scheme and improves the scheduling flexibility.

Figure 2:
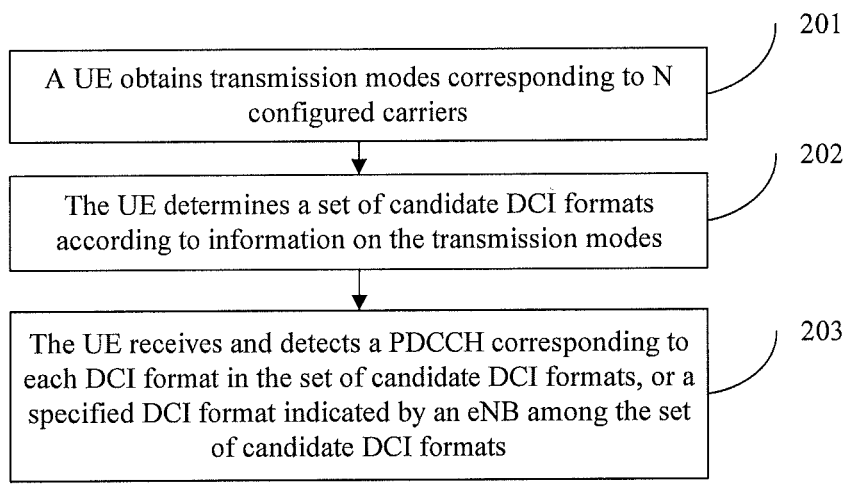
FIG. 2 is a flowchart of a method for receiving scheduling information according to an embodiment of the present invention.

As shown in FIG. 2, an embodiment of the present invention provides a method for receiving scheduling information, including:

Step 201: A UE obtains transmission modes corresponding to N configured carriers.

In this embodiment, a network device configures N carriers for the UE by using RRC dedicated signaling. Specifically, an eNB is used as an example of the network device in the description. The eNB configures N carriers for the UE by using RRC dedicated signaling, where N is a natural number greater than 1. In this embodiment, for example, N equals 3. It is assumed that three carriers are CC0 (main carrier), CC1, and CC2, and MIMO mode is not applied in the uplink. Under each transmission mode, there are two DCI formats. It is assumed that the downlink transmission modes of the three carriers correspond to DCI formats B, C, and D respectively, and DCI formats 0 (the DCI of non-MIMO mode in the uplink is DCI 0 only) and 1A corresponding to the common transmission mode are uniformly denoted by A.

In this embodiment, by receiving the RRC dedicated signaling sent by the network device, the UE obtains information about N carriers configured by the network device for the UE and a transmission mode corresponding to each carrier.

Step 202: The UE determines a set of candidate DCI formats according to information about the transmission modes.

In this embodiment, the set of candidate DCI formats includes at least a first DCI format and a second DCI format. The PDCCH corresponding to the first DCI format carries scheduling information of at least two carriers of the N carriers, and the at least two carriers in the first format employ a joint coding scheme. The PDCCH corresponding to the second DCI format carries scheduling information of one carrier of the N carriers, and the one carrier in the second format employs a separate coding scheme. In this embodiment, the first DCI format may be a combination of two DCIs (such as DCI B and DCI C); or may be a combination of any two DCIs in DCI B, DCI C, and DCI D; or may be a combination of DCIs in the jointly coded scheduling information of any two carriers of the three carriers. The second DCI format may be DCI A or B, that is, DCI A or B applied when only a single carrier CC0 is configured. In other words, DCI A and DCI B are DCI formats in a single-carrier system of an early LTE release (a release earlier than LTE Release 10, for example, LTE Release 8).

All DCI formats in the set of candidate DCI formats are available for the network device to schedule the UE. On the basis that the UE blindly detects all DCI formats in the set, the number of DCI formats available for the UE to detect in the set should not exceed the configured number of CCs multiplied by the number of DCI formats corresponding to each CC. When the uplink data transmission is not MIMO multi-layer transmission, M=2. When the uplink data transmission is not MIMO multi-layer transmission, M=3, that is, the number of detections does not exceed the number of detections in a PDCCH separate coding scheme. In this embodiment, M=2 and N=3. Further, on the basis that the UE blindly detects all DCI formats in the set, the maximum number of blind detections configured by the network device for the UE may be used as a benchmark for designing the DCI formats available for detection of the UE in the set.

Further, the first DCI format supports disabling (disable) scheduling information of at least one carrier of the at least two carriers. For example, the set includes a DCI B+C combination for scheduling two carriers CC 0 and CC 1. If the base station needs only to use a DCI C scheduling mode to schedule CC 1 of the UE at a specific time point according to a channel state of each carrier of a service of the UE, and, if no separate DCI C is available in the set of candidate DCI formats at the time point, it is necessary to use a DCI B+C combination and support disabling scheduling information of DCI B of CC 0. The specific disabling method is: the scheduling information of the disabled carrier is filled with all 0s; for example, all bit fields of the scheduling information of DCI B in the DCI B+C combination are set to 0s; or, a specific bit field or a specific combination of multiple bit fields in the scheduling information of a carrier is used to indicate that the carrier is disabled, for example, a specific combination of a MCS (Modulation and Coding Scheme, modulation and coding scheme) bit field and an RV (redundant version, Redundant Version) bit field, or a specific combination of a MCS bit field and a resource allocation bit field, or, a redundant state of a precoding information bit field.

Correspondingly, when the terminal receives a PDCCH which is sent by the eNB and corresponding to the first DCI format, and determines that, in the PDCCH corresponding to the first DCI format, scheduling information of at least one carrier of the at least two carriers is disabled, the terminal receives corresponding downlink data or sends corresponding uplink data according to scheduling information of other carriers of the at least two carriers except the scheduling information of the at least one disabled carrier.

Further, at least one carrier of the at least two carriers indicated in the PDCCH corresponding to the first DCI employs a DCI 0 or 1A scheduling mode. For example, in the set of candidate DCI formats, the DCIs for scheduling two carriers include: a DCI A+A combination, and a DCI B+C/C+D/B+D combination. In the latter combination, formats are distinguished by adding two format headers. Evidently, the DCIs do not support a combination of a fallback format and a downlink mode related format, such as A+C, A+D, and B+A. In this case, a scheduling mode of falling back to fallback format A may be indicated by using a specific bit field or a combination of multiple bit fields in B or C or D, for example, an MCS bit field, and/or, an RV bit field, and/or, a resource allocation bit field, and/or, a precoding information bit field.

Correspondingly, when the terminal receives a PDCCH which is sent by an eNB and corresponding to the first DCI format, and determines that at least one carrier of the at least two carriers indicated in the PDCCH corresponding to the first DCI format falls back to a DCI 0 or 1A scheduling mode, the terminal receives corresponding downlink data or sends corresponding uplink data over the at least one carrier according to scheduling information of DCI 0 or 1A.

DCI 0 or 1A mentioned in the above solution is based on a format in an existing LTE system. In subsequent releases of LTE, DCI 0 or 1A may be modified. For example, new control information fields may be added, and even the name of the DCI format may be changed. However, so long as it indicates a scheduling mode characterized by compact resource allocation, and single antenna port or transmit diversity, it belongs to the DCI 0 or 1A category mentioned in the solution, and this embodiment imposes no limitation thereon.

Preferably, the PDCCH corresponding to the first DCI format carries at least scheduling information of a main carrier of the N carriers. For example, in this embodiment, the set of candidate DCI formats includes a combination of DCI formats B+C for scheduling two carriers, and/or, a combination of DCI formats B+C+D for scheduling three carriers, where DCI B is scheduling information of the main carrier CC0.

Further, in this embodiment, optionally, the set of candidate DCI formats includes at least L first DCI formats, where L is N−1, and the PDCCHs respectively corresponding to the L first DCI formats each carry jointly coded scheduling information of M carriers of the N carriers, where M=2, 3, . . . , N. In this embodiment, the eNB has configured three carriers for the UE. Therefore, the set of candidate DCI formats includes two first formats, one is a DCI format (such as B+C and A+A) of jointly coded scheduling information of two carriers of the three configured carriers, and the other is a DCI format (such as B+C+D and A+A+A) of jointly coded scheduling information of the three configured carriers.

Further, the at least one first DCI format in the L first DCI formats includes header information used to identify a combination of carriers indicated in the PDCCH corresponding to the at least one first DCI format, where the combination of carriers includes M carriers.

Optionally, the second DCI format includes header information, where the header information is used to identify a carrier indicated in the PDCCH corresponding to the second DCI format.

Optionally, the UE may further obtain identifier information of each carrier of the N carriers configured by the eNB for the UE, and the UE may determine scheduling information of a corresponding specific carrier according to the identifier information of each carrier of the N carriers and the header information.

In this embodiment, the DCI format may be DCI A or B or C or D, that is, may indicate separately coded scheduling information of any one carrier. In this case, in order not to increase PDCCH detections performed by the UE in comparison with the separate coding PDCCH scheme, the candidate DCI formats of the UE need to be reduced, for example, reduced from four to two, of which one is DCI A and the other is designed by aligning the payload size. Specifically, the other DCI may be designed according to a maximum payload size of B, C, and D, and the DCI format whose payload size is less than the maximum payload size needs to be filled with bits, for example, filled with 0s. Moreover, header information needs to be added to distinguish between the formats. Specifically, assuming that the payload size of DCI B is greater than that of C or D, C and D need to be filled with a certain number of 0s to align with the payload size of B. In addition, a two-bit format header needs to be added in B, C, and D to make up the final format E. The format header is used to distinguish between the three formats. For example, the format header state '00' indicates DCI B, '01' indicates DCI C, '10' indicates DCI D, and the remaining state '11' may indicate a scheduling mode of format A, such as transmit diversity or single-antenna-port transmission, but differ from format A in the resource allocation mode. Therefore, the eNB may use DCI A or E where a single carrier is separately coded to schedule any one carrier of the UE. Correspondingly, the UE needs to use DCI formats of two payload sizes of candidate DCI A and E to detect the PDCCH, and further determine a specific DCI format according to the header information.

Preferably, in this embodiment, the PDCCH corresponding to the second DCI format only carries separately coded scheduling information of a main carrier. In this embodiment, the second DCI format may be DCI A or B, that is, DCI A or B applied when only a single carrier CC 0 is configured. In other words, DCI A and DCI B are DCI formats in a single-carrier LIE system. Therefore, if the eNB only schedules CC 0 to the UE, the eNB may use DCI A or B to schedule data transmission of CC 0; and correspondingly, the UE uses candidate DCI A and DCI B to detect the PDCCH.

In this embodiment, in the N carriers configured by the network device for the terminal, there is at least one extension carrier and at least one non-extension carrier. Therefore, the PDCCH corresponding to the first DCI format included in the set of candidate DCI formats carries jointly coded scheduling information of the at least one extension carrier and the at least one non-extension carrier. The non-extension carrier is a carrier backward-compatible with the existing LTE system, that is, a carrier where a UE in a system of an early release can access to make a communication. The extension carrier is not backward-compatible with the existing LTE system, but is a carrier in a system of a future LTE release, that is, a carrier that is not accessible to a UE in a system of an early release. For example, on the extension carrier, there is no common reference signal, no common public channel (such as backward-compatible synchronization channel, broadcast channel, and paging channel), and even no backward-compatible PDCCH region. Specifically, the scheduling information of an extension carrier needs to be jointly encoded with the scheduling information of a non-extension carrier, and a DCI format that schedules an extension carrier separately is not supported.

In this embodiment, to reduce the number of PDCCH detections performed by the UE and avoid increase of PDCCH detections in comparison with a separate coding PDCCH scheme, one solution is to make it necessary for the UE to detect only two payload sizes for DCIs of jointly coded scheduling information of two carriers. Therefore, the payload size needs to be aligned, and format headers need to be added to distinguish between different DCI format combinations. Specifically, for the first DCI format, it is assumed that, in the DCI formats of two payload sizes, one format is an A+A combination A2, where the scheduling information of two specific carriers needs to be distinguished by a format header. The other format DCI F may be designed by selecting two DCIs of greatest payload sizes in B, C, and D, and, assuming that B and C are selected, the DCI combination of the other two carriers is aligned with the combination of B and C in terms of payload size, for example, by filling with 0s and adding a distinguishing format header. Specifically, the set of candidate DCI formats includes B+C, B+D, and C+D, and, in this case, the three combinations in the set need to be distinguished by two format headers. On the basis of the three combinations, the set may include other combinations such as A(CC1)+B, A(CC2)+B, A(CC0)+C, A(CC2)+C, A(CC0)+D, and A(CC1)+D, and, in this case, A in the combination may be DCI A, or may indicate a scheduling mode of format A such as transmit diversity or single-antenna-port transmission, but differ from format A in the resource allocation mode. In addition, four format headers are required to distinguish one another, and the occurrence of some combinations may be restricted to save overhead of format headers. Therefore, the eNB may use DCI A2 or F where two carriers are jointly coded to schedule two carriers of the UE. Correspondingly, the UE needs to use DCI formats of two payload sizes of candidate DCI A2 and F to detect the PDCCH of two carriers scheduled by the eNB, and further determine a specific DCI format according to the header information.

Similarly, in this embodiment, the DCI format that carries jointly coded scheduling information of the three carriers may be a combination of DCIs B, C, and D or an A+A+A combination A3; or may be a combination of A+C+A, B+A+A, A+A+D, A+C+D, B+C+A, B+A+D, B+C+D, or A+A+A. In this case, the A in the combination may be DCI A, or may indicate the scheduling mode of format A, such as transmit diversity or single-antenna-port transmission, but differ from format A in the resource allocation mode. To reduce the number of PDCCH detections performed by the UE and avoid increase of PDCCH detections in comparison with a separate coding PDCCH scheme, one solution is to make it necessary for the UE to detect only two payload sizes for DCIs of jointly coded scheduling information of the three carriers. Therefore, the payload size needs to be aligned, and format headers need to be added to distinguish between different DCI format combinations. Specifically, in the DCI formats of two payload sizes, one format is an A+A+A combination A3, and the other format DCI G may be designed by designing the payload size according to a combination of B, C, and D. Therefore, the DCI combination of the other three carriers is aligned with the combination of B, C and D in terms of payload size, for example, by filling with 0s and adding three distinguishing format headers; and occurrence of some combinations may be restricted to save overhead of format headers. Therefore, the eNB may use DCI A3 or G where three carriers are jointly coded to schedule three carriers of the UE. Correspondingly, the UE needs to use DCI formats of two payload sizes of candidate DCI A3 and G to detect the PDCCH of the three carriers scheduled by the eNB, and further determine a specific DCI format according to the header information.

Step 203: The UE receives and detects a PDCCH corresponding to each DCI format in the set of candidate DCI formats, or a specified DCI format indicated by the eNB among the set of candidate DCI formats.

Optionally, in this embodiment, after configuring carriers for the terminal, the eNB determines the set of candidate DCI formats of the UE according to the transmission mode information of the carriers. The eNB selects one or more DCI formats from the set of candidate DCI formats, and notifies the UE through signaling, where the signaling is preferably physical layer signaling (such as PDCCH), but may also include high layer signaling (such as media access control MAC signaling or radio resource control RRC signaling); and, according to the notification from the eNB, the UE receives and detects the PDCCH corresponding to the one or more DCI formats selected by the eNB. Specifically, if the eNB prefers a PDCCH for selecting one or more DCI formats in the set of candidate DCI formats, the PDCCH may include specific bit field information for indication. For example, the set of candidate DCI formats include eight DCI formats, and therefore, the specific bit field may be three bits to indicate a specific format of the eight DCI formats in the set, or may be two bits to indicate two specific formats of the eight DCI formats in the set. Other indication methods are similar and not repeated here any further.

Optionally, in this embodiment, the UE may further determine search space for each DCI format in the set of candidate DCI formats, and detect the PDCCH corresponding to each DCI format blindly in the search space. The search space may be located in a control region in the first three symbols of the LTE system, and correspondingly, the UE detects the PDCCH according to a common reference symbol; or the search space may be located in a data region in other than the first three symbols of the LIE system, and correspondingly, the UE detects the PDCCH according to a UE-specific reference symbol. The specific embodiment is as follows:

In this embodiment, in the set of candidate DCI formats determined according to step 203, if the eNB only schedules CC 0 to the UE, the eNB may use a PDCCH corresponding to DCI A or B for scheduling, and correspondingly, the UE uses candidate DCIs A and B to detect the PDCCH; or, the eNB may use the PDCCH corresponding to DCI A2 (A+A) or F where two carriers are jointly coded to schedule two carriers of the UE, and correspondingly, the UE needs to use DCI formats of two payload sizes of candidate DCIs A2 and F to detect the PDCCH used to schedule two carriers, and use header information to further determine a specific DCI format; or the eNB may use the PDCCH corresponding to DCI A3 (A+A+A) or G where three carriers are jointly coded to schedule three carriers of the UE, and correspondingly, the UE needs to use DCI formats of two payload sizes of candidate DCI A3 and G to detect the PDCCH used to schedule three carriers, and use header information to further determine a specific DCI format.

In this embodiment, preferably, the UE detects a PDCCH on the main carrier only. In this way, the operation is easy to implement, and keeps consistent with a solution in a cross-carrier scheduling (all PDCCHs of the UE are placed on the main carrier) scenario, and moreover, with reserved uplink ACK/NACK resources corresponding to CCE indexes, the ACK/NACK overhead is saved. Preferably, the UE detects a PDCCH on the main carrier only, where, for each CCE aggregation level, a start CCE index of a search space of PDCCHs used to schedule i carriers and a start CCE index of a search space of PDCCHs used to schedule j carriers are independent (where i and j=1, . . . , N, and i!=j). Specifically, a carrier indication field or a cell index number may be used for distinguishing. Independent search spaces can reduce the probability of PDCCH conflict between UEs or the probability of PDCCH congestion. That is, if all positions of candidate PDCCHs in the search space of a UE are occupied by other UEs, the UE cannot be scheduled.

Further, the UE detects a PDCCH on the main carrier only. Optionally, for each CCE aggregation level, a start CCE index of search space of PDCCHs used to schedule i carriers and a start CCE index of search space of PDCCHs used to schedule j carriers may also be the same (where i and j=1, . . . , N, and i!=j). Such an operation is easy to implement, and the PDCCH congestion of a UE itself is avoided because the eNB schedules different numbers of carriers by scheduling only one PDCCH for the UE.

Optionally, the UE may detect PDCCHs on multiple carriers. A correspondence relationship between a PDCCH and at least one carrier scheduled by the PDCCH may be pre-configured without the need of a signaling notification, or configured through signaling of the eNB.

Further, the number of candidate PDCCHs in the search space of PDCCHs used to schedule i carriers and the number of candidate PDCCHs in the search space of PDCCHs used to schedule j carriers may be independent, without depending on the detection method corresponding to the original CCE. The specific number may be pre-configured by the UE or set through signaling of the eNB.

Specifically, in this embodiment, the payload size differs sharply between DCI formats used to schedule different numbers of carriers. For example, when DCI 2 is used to schedule a single carrier, the payload size is about 70 bits; if three carriers are scheduled, the payload size is about 178; and, if five carriers are scheduled, the payload size is about 286.

When the payload size is small, the probability of using a low CCE aggregation level is high, for example, an aggregation level of one or two CCEs, and, in this case, the number of candidate PDCCHs in the search space of the two CCE aggregation levels may be increased properly. On the contrary, when the payload size is large, the probability of using a high CCE aggregation level is high, for example, an aggregation level of four or eight CCEs or a higher CCE aggregation level, and, in this case, the number of candidate PDCCHs in the search space of these CCE aggregation levels may be increased properly.

In this embodiment, if the uplink transmission employs MIMO mode, the format corresponding to the uplink MIMO mode is E; that is, CC 0 includes DCIs A, B, and E, CC 1 includes DCIs A, C, and E, and CC 2 includes DCIs A, D, and E. The DCI format E related to the uplink mode may be processed in two manners. One manner is to design it separately from the DCI formats B, C, and D related to the downlink mode or a combination thereof, for example, the candidate DCI formats of scheduling information of the three carriers to be detected are an A+A+A combination A3, a B+C+D combination, and a E+E+E combination E3; and the other manner is to design it uniformly with the DCI formats B, C, and D related to the downlink mode or a combination thereof, that is, a combination of B, C, D, and E may be designed uniformly by using joint coding. The specific design under the two manners is the same as the design in a scenario where the MEMO mode is not applied. The design includes payload size alignment and addition of header information, which is not repeated here any further.

In this embodiment, a specific method of indicating an uplink ACK/NACK resource corresponding to a PDSCH is: if the UE receives only a separately coded PDCCH used to schedule a single carrier, the UE uses an uplink ACK/NACK resource corresponding to one CCE index of the PDCCH to feed back an uplink ACK/NACK; if the UE receives jointly coded PDCCHs used to schedule at least two carriers, the UE uses an ACK/NACK resource indicated by one TPC bit field in the PDCCH to feed back the ACK/NACK. A PDCCH includes at most two TPC bit fields (because the two TPC bit fields have four bits in total, which do not increase linearly with the number of scheduled carriers, the bit overhead of jointly coded PDCCHs is reduced), of which one TPC is used as a power control command word, and the other TPC is used as an ACK/NACK resource indication.

In particular, if the ACK/NACK is fed back in channel selection mode, the indication method further includes: using, by the terminal if the state of the TPC bit field used as an uplink ACK/NACK resource indication is a first state, an uplink ACK/NACK resource corresponding to one CCE index of the PDCCH to feed back the uplink ACK/NACK; and, if the state of the TPC bit field used as an uplink ACK/NACK resource indication is not the first state, using an uplink ACK/NACK resource indicated by the TPC bit field used as an uplink ACK/NACK resource indication, to feed back the uplink ACK/NACK. The first state may be preset, for example, to '00', or may be expressed in other manners, which is not limited in this embodiment.

In this embodiment, specifically, the terminal may determine, according to a set of downlink carriers scheduled by a PDCCH, the number of bits of an uplink ACK/NACK corresponding to downlink data in the set of scheduled downlink carriers, and encode the bits of the uplink ACK/NACK and feed back them to the network device, where the set of downlink carriers includes at least one downlink carrier.

In this embodiment, the eNB may use one PDCCH to schedule downlink data transmission of the UE, which avoids the omission of some PDCCHs during detection of the UE. Therefore, the UE may determine the number of bits of the uplink ACK/NACK corresponding to the scheduled PDSCH according to the set of carriers scheduled by the eNB and the transmission mode of each carrier in the set, which improves performance of the ACK/NACK or reduces overhead of the ACK/NACK.

The benefits of the technical solution provided in the embodiment of the present invention are: the jointly coded PDCCHs do not necessarily reserve the payload size according to all carriers configured for the UE, which may reduce the PDCCH resource overhead of the PDCCH joint coding scheme; and the DCI format set includes one to N DCI formats for scheduling various numbers of carriers, which improves the scheduling flexibility, By aligning or restricting the payload size, the number of PDCCH detections is kept from exceeding the number of detections in an separate coding PDCCH scheme; the size of the search space, that is, the number of detections of PDCCHs of each payload size in the search space is not only related to the CCE level, but also related to the payload size of PDCCHs used to schedule different numbers of carriers, which makes the design of the search space more flexible and optimizes the probability of PDCCH congestion; for a specific subframe, the eNB schedules only one downlink grant to the UE, and therefore, the number of original bits of the uplink ACK/NACK may be determined according to the number of carriers scheduled in real time for the UE, which reduces the resource overhead of the ACK/NACK, or improves performance of the ACK/NACK under the same resource overhead.

Figure 3:
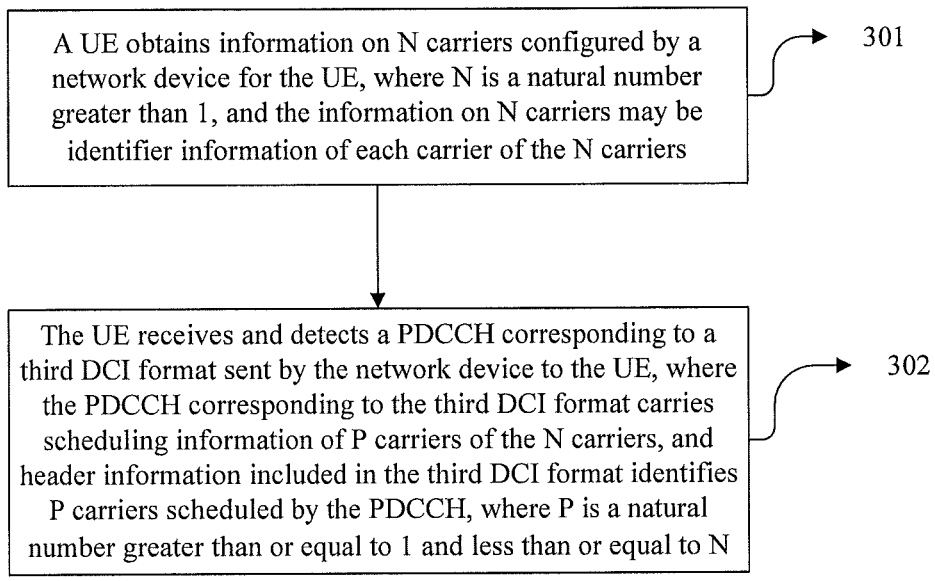
FIG. 3 is a flowchart of a method for receiving scheduling information according to an embodiment of the present invention.

As shown in FIG. 3, an embodiment of the present invention provides a method for receiving scheduling information, including the following:

Optionally, step 301: A UE obtains information about N carriers configured by a network device for the UE, where N is a natural number greater than 1. The information about N carriers may be identifier information of each carrier of the N carriers.

Step 302: The UE receives and detects a PDCCH corresponding to a third DCI format sent by the network device to the UE, where the PDCCH corresponding to the third DCI format carries scheduling information of P carriers of the N carriers, and header information included in the third DCI format identifies the P carriers scheduled by the PDCCH, where P is a natural number greater than or equal to 1 and less than or equal to N.

In this embodiment, control information of multiple carriers is encoded jointly, which means that a jointly coded PDCCH schedules multiple carriers. Compared with a separate coding scheme in which one PDCCH schedules only one carrier, the solution in this embodiment may at least save overhead of cyclic redundancy check CRC bits because the jointly coded PDCCH needs only one CRC bit. In order to further reduce overhead of the jointly coded PDCCH, the bit overhead of a resource allocation field may be reduced. Specifically, header information may be added to a PDCCH corresponding to a jointly coded DCI format. The header information is used to identify the number of carriers scheduled by the PDCCH and specific carrier information. Further, according to the header information, meanings of other bit fields such as resource allocation granularity in the PDCCH are determined. The network device and the UE can communicate based on the jointly coded PDCCH.

Optionally, the UE may obtain the scheduling information of each carrier of the P carriers according to the header information of the third DCI format, and handle data transmission of each carrier of the P scheduled carriers according to the scheduling information. Specifically, the UE may determine the specifically scheduled P carriers according to the obtained information about the N carriers and the header information of the third DCI format, and further determine the scheduling information corresponding to each carrier of the P carriers.

According to the foregoing method, the resource block allocation granularity used by the P=P1 carriers scheduled by the network device for the UE is greater than the resource block allocation granularity used by the P=P2 scheduled carriers, where P1 is greater than P2.

Specifically, the payload size of the PDCCH corresponding to the third DCI format may be fixed. When the PDCCH schedules P1 carriers or P2 carriers, the payload size of the PDCCH may be fixed by adjusting the resource block allocation granularity of each carrier correspondingly, for example, when P1 carriers are scheduled, using a resource block allocation granularity which is greater than the resource block allocation granularity of each carrier when P2 carriers are scheduled. Preferably, the adjusted resource block allocation granularity of a carrier is an integer multiple of the resource block allocation granularity when the carrier is scheduled separately in the prior art.

By using the above method, different numbers of carriers may be scheduled by using the PDCCH corresponding to one DCI format, and the payload size of the PDCCH is reduced by adjusting the resource block allocation granularity, which further reduces the overhead of the jointly coded PDCCH.

It is assumed that the network device has configured three carriers, CC 0, CC 1, and CC 2, for the UE. The network device uses a PDCCH corresponding to a jointly coded DCI format (third DCI format) to perform data scheduling for the UE, where the PDCCH includes header information, where the header information is used to identify the number of carriers scheduled by the PDCCH and information about specific carriers. For example, CC 0, CC 1, and CC 2 are scheduled for the UE, which means that all the three configured carriers are scheduled. The UE detects the PDCCH, and, by parsing the header information in the PDCCH, determines that the network device has scheduled CC 0, CC 1, and CC 2, that is, all the three configured carriers, for the UE. Further, the UE parses the remaining bit fields of the PDCCH according to the header information by using the scheduling information corresponding to the three carriers, for example, parses a resource allocation bit field by using a resource allocation granularity corresponding to the three carriers.

For another example, it is assumed that the network device has configured three carriers, CC 0, CC 1, and CC 2, for the UE. The network device uses a PDCCH corresponding to a jointly coded DCI format (third DCI format) to perform data scheduling for the UE, where the PDCCH includes header information and the header information is used to identify the number of carriers scheduled by the PDCCH and information about specific carriers. For example, CC 0 and CC 1 are scheduled for the UE. The UE detects the PDCCH, and, by parsing the header information in the PDCCH, determines that the network device has scheduled CC 0 and CC 1 for the UE. The UE parses the remaining bit fields of the PDCCH according to the header information by using the scheduling information corresponding to the two carriers (the two carriers are CC 0 and CC1), for example, parses a resource allocation bit field by using a resource allocation granularity corresponding to the two carriers, where the resource allocation granularity corresponding to the two carriers may be less than the resource allocation granularity corresponding to the three carriers.

The third DCI format in this embodiment may serve as a specific instance of the first DCI format or the second DCI format in the preceding embodiment, which is not limited in this embodiment.

Figure 4:
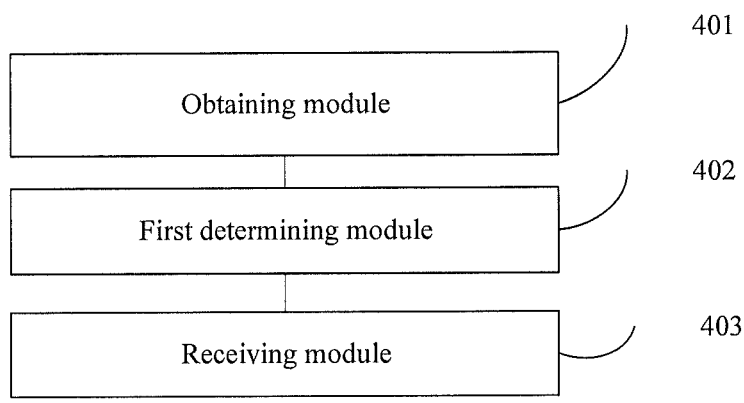
FIG. 4 is a schematic structural diagram of a terminal according to an embodiment of the present invention.

As shown in FIG. 4, an embodiment of the present invention provides a terminal, including an obtaining module 401, a determining module 402, and a receiving module 403.

The obtaining module 401 is configured to obtain transmission mode information of each carrier of N carriers configured by a network device for the terminal, where N is a natural number greater than 1;

The determining module 402 is configured to determine a set of candidate DCI formats according to the transmission mode information, where the set of candidate DCI formats includes at least a first DCI format and a second DCI format, where a PDCCH corresponding to the first DCI format carries scheduling information of at least two carriers of the N carriers, and a PDCCH corresponding to the second DCI format carries scheduling information of one carrier of the N carriers; and The receiving module 403 is configured to receive and detect a PDCCH corresponding to each DCI format in the set of candidate DCI formats, or a specified DCI format indicated by the network device among the set of candidate DCI formats.

Figure 5:
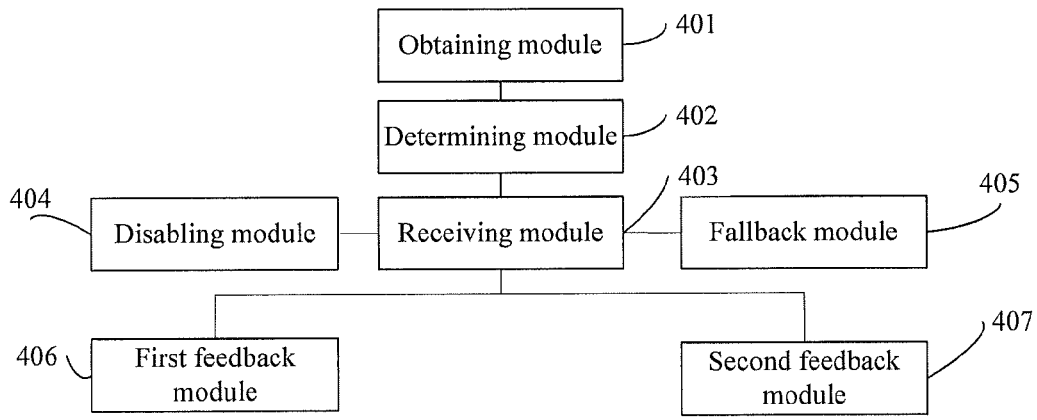
FIG. 5 is a schematic structural diagram of another terminal according to an embodiment of the present invention.

As shown in FIG. 5, further, the terminal in this embodiment further includes:

a disabling module 404, configured to receive a PDCCH which is sent by the network device and corresponding to the first DCI format, determine that, in the PDCCH corresponding to the first DCI format, scheduling information of at least one carrier of the at least two carriers is disabled, and receive corresponding downlink data or send corresponding uplink data according to scheduling information of other carriers of the at least two carriers except the scheduling information of the at least one disabled carrier.

As shown in FIG. 5, the terminal in this embodiment further includes:

a fallback module 405, configured to receive a PDCCH which is sent by the network device and corresponding to the first DCI format, determine that at least one carrier of the at least two carriers indicated in the PDCCH corresponding to the first DCI format employs a DCI 0 or 1A scheduling mode, and receive corresponding downlink data or send corresponding uplink data over at least one carrier of the at least two carriers according to scheduling information of DCI 0 or 1A.

Preferably, in this embodiment, the receiving module 304 further includes:

a detecting unit, configured to detect a PDCCH on a main carrier of the N carriers, where, for each CCE aggregation level, a start CCE index of search space of PDCCHs used to schedule i carriers and a start CCE index of a search space of PDCCHs used to schedule j carriers are independent or the same, where i and j=1, . . . , N, and i!=j.

As shown in FIG. 5, preferably, the terminal in this embodiment further includes:

a first feedback module 406, configured to: if the terminal receives a PDCCH that carries joint coding information of at least two carriers, use an uplink ACK/NACK resource indicated by one Transmission Control Protocol TPC bit field in the PDCCH to feed back an uplink ACK/NACK, where the PDCCH includes at most two TPC bit fields, of which one TPC bit field is used as a power control command word, and the other TPC bit field is used as an uplink ACK/NACK resource indication.

As shown in FIG. 5, the terminal in this embodiment further includes:

a second feedback module 407, configured to determine the number of bits of an uplink ACK/NACK corresponding to downlink data in a set of scheduled downlink carriers according to the set of downlink carriers of the N carriers scheduled by the PDCCH, and encode the bits of the uplink ACK/NACK and feed them back to the network device, where the set of downlink carriers includes at least one downlink carrier.

The benefits of the method embodiment provided in the present invention are: a set of candidate DCI formats includes at least a first DCI format and a second DCI format, where the first DCI format carries jointly coded scheduling information of at least two carriers of N carriers, and the second DCI format carries separately coded scheduling information of one carrier of the N carriers. In this way, a network device schedules UEs according to PDCCHs of DCI formats in the set of candidate DCI formats. Correspondingly, a UE detects PDCCHs according to the DCI formats in the set of candidate DCI formats. Evidently, for jointly coded PDCCHs, it is not necessary to reserve a payload size according to all carriers configured for the UE, which reduces resource overhead of the PDCCHs under a PDCCH joint coding scheme and improves the scheduling flexibility.

Figure 6:
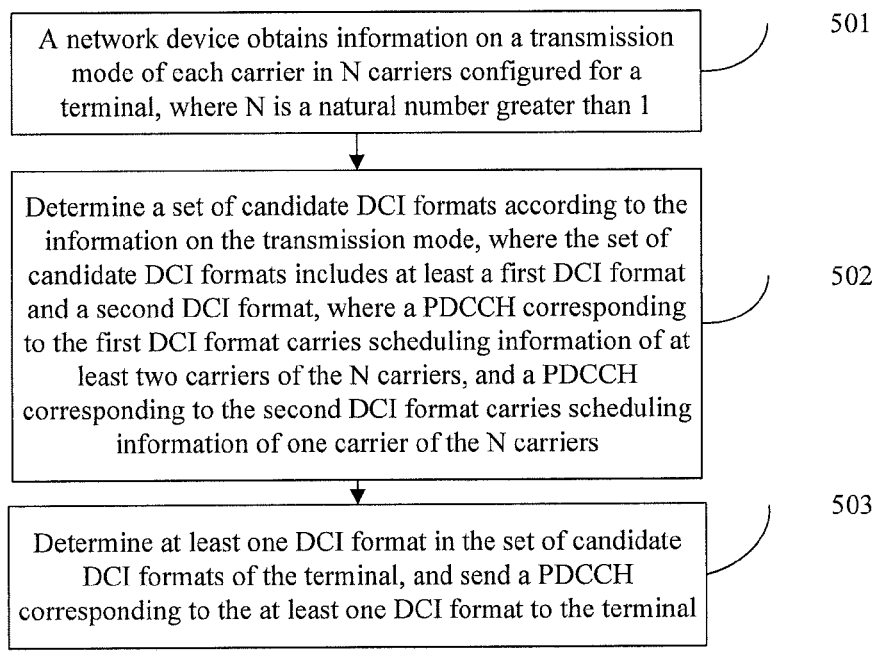
FIG. 6 is a flowchart of a method for sending scheduling information according to an embodiment of the present invention.

As shown in FIG. 6, an embodiment of the present invention provides a method for sending scheduling information, including the following:

Step 501: A network device obtains transmission mode information of each carrier of N carriers configured for a terminal, where N is a natural number greater than 1.

Step 502: Determine a set of candidate DCI formats according to the transmission mode information, where the set of candidate DCI formats includes at least a first DCI format and a second DCI format, where a PDCCH corresponding to the first DCI format carries scheduling information of at least two carriers of the N carriers, and a PDCCH corresponding to the second DCI format carries scheduling information of one carrier of the N carriers.

Step 503: Determine at least one DCI format in the set of candidate DCI formats of the terminal, and send a PDCCH corresponding to the at least one DCI format to the terminal.

The first DCI format supports disabling scheduling information of at least one carrier of the at least two carriers.

At least one carrier of the at least two carriers indicated in the PDCCH corresponding to the first DCI employs a DCI 0 or 1A scheduling mode.

Further, the set of candidate DCI formats includes at least L first DCI formats, where L is N−1, and the PDCCHs respectively corresponding to the L first DCI formats each carry a DCI format of jointly coded scheduling information of M carriers of the N carriers, where M=2, 3, . . . , N.

At least one first DCI format of the L DCI formats includes header information used to identify a combination of carriers indicated in a PDCCH corresponding to the at least one first DCI format, where the combination of carriers includes M carriers.

Optionally, the second DCI format includes header information, where the header information is used to identify a carrier indicated in the PDCCH corresponding to the second DCI format.

Preferably, the PDCCH corresponding to the second DCI format carries separately coded scheduling information of a main carrier of the N carriers.

After at least one first DCI format in the set of candidate DCI formats of the terminal is determined, the method further includes:

sending indication information to the terminal, where the indication information includes at least one DCI format determined by the network device among the set of candidate DCI formats of the terminal.

The method for sending scheduling information in this embodiment corresponds to the method for receiving scheduling information in the preceding embodiment, and is not detailed here any further.

The benefits of the method embodiment provided in the present invention are: a set of candidate DCI formats includes at least a first DCI format and a second DCI format, where the first DCI format carries jointly coded scheduling information of at least two carriers of N carriers, and the second DCI format carries separately coded scheduling information of one carrier of the N carriers. In this way, a network device schedules UEs according to PDCCHs of DCI formats in the set of candidate DCI formats. Correspondingly, a UE detects PDCCHs according to the DCI formats in the set of candidate DCI formats. Evidently, for jointly coded PDCCHs, it is not necessary to reserve a payload size according to all carriers configured for the UE, which reduces resource overhead of the PDCCHs under a PDCCH joint coding scheme and improves the scheduling flexibility.

Figure 7:
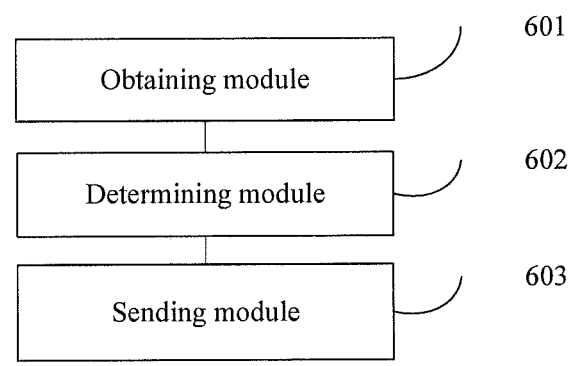
FIG. 7 is a schematic structural diagram of a network device according to an embodiment of the present invention.

As shown in FIG. 7, an embodiment of the present invention provides a network device, including an obtaining module 601, a determining module 602, and a sending module 603.

The obtaining module 601 is configured to obtain transmission mode information of each carrier of N carriers configured for a terminal, where N is a natural number greater than 1;

The determining module 602 is configured to determine a set of candidate DCI formats according to the transmission mode information, where the set of candidate DCI formats includes at least a first DCI format and a second DCI format, where a PDCCH corresponding to the first DCI format carries scheduling information of at least two carriers of the N carriers, and a PDCCH corresponding to the second DCI format carries scheduling information of one carrier of the N carriers; and The sending module 603 is configured to determine at least one DCI format in the set of candidate DCI formats of the terminal, and send a PDCCH corresponding to the at least one DCI format to the terminal.

Figure 8:
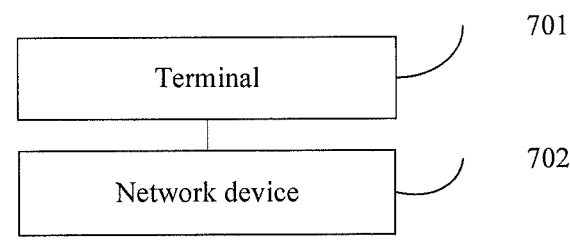
FIG. 8 is a schematic diagram of a system for receiving and sending scheduling information according to an embodiment of the present invention.

As shown in FIG. 8, an embodiment of the present invention further provides a system for receiving and sending scheduling information, where the system includes a terminal 701 according to a preceding embodiment and a network device 702 according to a preceding embodiment.

The benefits of the system embodiment provided in the present invention are: a set of candidate DCI formats includes at least a first DCI format and a second DCI format, where the first DCI format carries jointly coded scheduling information of at least two carriers of N carriers, and the second DCI format carries separately coded scheduling information of one carrier of the N carriers. In this way, a network device schedules UEs according to PDCCHs of DCI formats in the set of candidate DCI formats. Correspondingly, a UE detects PDCCHs according to the DCI formats in the set of candidate DCI formats. Evidently, for jointly coded PDCCHs, it is not necessary to reserve a payload size according to all carriers configured for the UE, which reduces resource overhead of the PDCCHs under a PDCCH joint coding scheme and improves the scheduling flexibility.

The apparatus and the system provided in the embodiments of the present invention may be based on the same idea as the method embodiments. For the detailed implementation processes, see the method embodiments, and no repeated description is given here.

All or part of the steps of the technical solutions provided in the embodiments of the present invention may be implemented by a program instructing relevant hardware. The hardware may include a CPU, and the program may be stored in a readable storage medium such as a ROM, a RAM, a magnetic disk, or an optical disk, or any type of medium capable of storing program codes.

The foregoing descriptions are merely exemplary embodiments of the present invention, but are not intended to limit the present invention. Any modifications, equivalent substitutions, and improvements made within the spirit and principles of the present invention shall fall within the protection scope of the present invention.

According to the description of the foregoing embodiments, those skilled in the art may clearly understand that the present invention may be implemented by hardware or by software plus a necessary universal hardware platform. Based on such an understanding, the technical solutions of the present invention may be embodied in the form of a software product. The software product may be stored in a non-volatile storage medium (such as a CD-ROM, a USB disk, or a mobile hard disk), and contain several instructions that enable a computer device (such as a personal computer, a server, or a network device) to perform the methods according to the embodiments of the present invention.

It is understandable to those skilled in the art that an accompanying drawing here is only a schematic diagram of a preferred embodiment, and the modules or processes in the drawing are not necessarily required for implementing the present invention.

Those skilled in the art understand that modules in an apparatus in an embodiment of the present invention may be distributed in the apparatus of the embodiment as described here, or otherwise with corresponding changes made, located in one or more apparatuses different from that in the embodiment. The modules in the above embodiments may be combined into one module, or split into multiple submodules.

The sequence number of an embodiment of the present invention is for ease of description only, and does not represent priority of the embodiment.

The foregoing discloses only several specific embodiments of the present invention, but the present invention is not limited to such embodiments. All variations that can be derived by those of ordinary skill in the art shall fall within the protection scope of the present invention.

What is claimed is:

1. A method for receiving scheduling information, comprising:
    obtaining, by a terminal, transmission mode information of each carrier of N carriers configured by a network device for the terminal, wherein N is a natural number greater than 1;
    determining a set of candidate downlink control information DCI formats according to the transmission mode information, wherein the set of candidate DCI formats comprises at least a first DCI format and a second DCI format, wherein a physical downlink control channel PDCCH corresponding to the first DCI format carries scheduling information of at least two carriers of the N carriers, and a PDCCH corresponding to the second DCI format carries scheduling information of one carrier of the N carriers; and
    receiving and detecting a PDCCH corresponding to each DCI format in the set of candidate DCI formats, or a specified DCI format indicated by the network device among the set of candidate DCI formats,
    wherein, after receiving and detecting a PDCCH corresponding to each DCI format in the set of candidate DCI formats or a specified DCI format indicated by the network device among the set of candidate DCI formats, the method further comprises:
    if the terminal receives a PDCCH that carries joint coding information of at least two carriers, using an uplink positive acknowledgement/negative acknowledgement ACK/NACK resource indicated by one Transmission Control Protocol TPC bit field in the PDCCH to feed back an uplink ACK/NACK, wherein the PDCCH comprises at most two TPC bit fields, of which one TPC bit field is used as a power control command word, and the other TPC bit field is used as an uplink ACK/NACK resource indication.

2. The method according to claim 1, wherein the first DCI format supports disabling scheduling information of at least one carrier of the at least two carriers, and therefore, the detecting a PDCCH sent by the network device comprises:
    determining that, in the PDCCH corresponding to the first DCI, scheduling information of at least one carrier of the at least two carriers is disabled; and
    receiving corresponding downlink data or sending corresponding uplink data according to scheduling information of other carriers of the at least two carriers except the scheduling information of the at least one disabled carrier.

3. The method according to claim 1, wherein at least one carrier of the at least two carriers indicated in the PDCCH corresponding to the first DCI format employs a DCI 0 or 1A scheduling mode.

4. The method according to claim 3, wherein the detecting a PDCCH corresponding to each DCI format in the set of candidate DCI formats or a specified DCI format indicated by the network device among the set of candidate DCI formats comprises:
    determining that at least one carrier of the at least two carriers indicated in the PDCCH corresponding to the first DCI falls back to the DCI 0 or 1A scheduling mode; and
    receiving corresponding downlink data or sending corresponding uplink data over at least one carrier of the at least two carriers according to scheduling information of DCI 0 or 1A.

5. The method according to claim 1, wherein the PDCCH corresponding to the first DCI format carries at least scheduling information of a main carrier of the N carriers.

6. The method according to claim 1, wherein the second DCI format comprises header information, wherein the header information is used to identify a carrier indicated in the PDCCH corresponding to the second DCI format.

7. The method according to claim 1, wherein the PDCCH corresponding to the second DCI format carries separately coded scheduling information of a main carrier of the N carriers.

8. The method according to claim 1, wherein the detecting a PDCCH corresponding to each DCI format in the set of candidate DCI formats or a specified DCI format indicated by the network device among the set of candidate DCI formats comprises:
    detecting a PDCCH on the main carrier of the N carriers, wherein, for each control channel element CCE aggregation level, a start CCE index of a search space of PDCCHs used to schedule i carriers and a start CCE index of a search space of PDCCHs used to schedule j carriers are independent or the same, wherein i and j=1, . . . , N, and i!=j.

9. The method according to claim 1, wherein, if the terminal receives a PDCCH of at least two jointly coded carriers, the using an uplink ACK/NACK resource indicated by one TPC bit field in the PDCCH to feed back an uplink ACK/NACK comprises:

using, by the terminal if a state of the TPC bit field used as an uplink ACK/NACK resource indication is a first state, an uplink ACK/NACK resource corresponding to one CCE index of the PDCCH to feed back the uplink ACK/NACK; or using, by the terminal if a state of the TPC bit field used as an uplink ACK/NACK resource indication is not a first state, an uplink ACK/NACK resource indicated by the TPC bit field used as an uplink ACK/NACK resource indication, to feed back the uplink ACK/NACK.

10. The method according to claim 1, further comprising:
determining, by the terminal according to a set of downlink carriers of the N carriers scheduled by the PDCCH, the number of bits of an uplink ACK/NACK corresponding to downlink data in the set of downlink carriers, and encoding the bits of the uplink ACK/NACK and feeding back them to the network device.

11. A method for receiving scheduling information, comprising:

obtaining, by a terminal, transmission mode information of each carrier of N carriers configured by a network device for the terminal, wherein N is a natural number greater than 1;

determining a set of candidate downlink control information DCI formats according to the transmission mode information, wherein the set of candidate DCI formats comprises at least a first DCI format and a second DCI format, wherein a physical downlink control channel PDCCH corresponding to the first DCI format carries scheduling information of at least two carriers of the N carriers, and a PDCCH corresponding to the second DCI format carries scheduling information of one carrier of the N carriers; and receiving and detecting a PDCCH corresponding to each DCI format in the set of candidate DCI formats, or a specified DCI format indicated by the network device among the set of candidate DCI formats, wherein the set of candidate DCI formats comprises at least L first DCI formats, wherein L is N−1, and PDCCHs respectively corresponding to the L first DCI formats each carry jointly coded scheduling information of M carriers of the N carriers, wherein M=2, 3, . . . , N.

12. The method according to claim 11, wherein at least one first DCI format of the L first DCI formats comprises header information used to identify a combination of carriers indicated in a PDCCH corresponding to the at least one first DCI format, wherein the combination of carriers comprises M carriers.

13. A terminal, comprising:
a memory, and
a processor coupled to the memory and configured to:
obtain transmission mode information of each carrier of N carriers configured by a network device for the terminal, wherein N is a natural number greater than 1;

determine a set of candidate downlink control information DCI formats according to the transmission mode information, wherein the set of candidate DCI formats comprises at least a first DCI format and a second DCI format, wherein a physical downlink control channel PDCCH corresponding to the first DCI format carries scheduling information of at least two carriers of the N carriers, and a PDCCH corresponding to the second DCI format carries scheduling information of one carrier of the N carriers;

receive and detect a PDCCH corresponding to each DCI format in the set of candidate DCI formats, or a specified DCI format indicated by the network device among the set of candidate DCI formats;

detect a PDCCH on a main carrier of the N carriers, wherein, for each control channel element CCE aggregation level, a start CCE index of a search space of PDCCHs used to schedule i carriers and a start CCE index of a search space of PDCCHs used to schedule carriers are independent or the same, wherein i and j=1, . . . , N, and i!=j; and if the terminal receives a PDCCH that carries joint coding information of at least two carriers, use an uplink positive acknowledgement/negative acknowledgement ACK/NACK resource indicated by one Transmission Control Protocol TPC bit field in the PDCCH to feed back an uplink ACK/NACK, wherein the PDCCH comprises at most two TPC bit fields, of which one TPC bit field is used as a power control command word, and the other TPC bit field is used as an uplink ACK/NACK resource indication.

14. The terminal according to claim 13, wherein the processor is further configured to:
receive a PDCCH which is sent by the network device and corresponding to the first DCI format, determine that, in the PDCCH corresponding to the first DCI format, scheduling information of at least one carrier of the at least two carriers is disabled, and receive corresponding downlink data or send corresponding uplink data according to scheduling information of other carriers of the at least two carriers except the scheduling information of the at least one disabled carrier.

15. The terminal according to claim 13, wherein the processor is further configured to:
receive a PDCCH which is sent by the network device and corresponding to the first DCI format, determine that at least one carrier of the at least two carriers indicated in the PDCCH corresponding to the first DCI format employs a DCI 0 or 1A scheduling mode, and receive corresponding downlink data or send corresponding uplink data over at least one carrier of the at least two carriers according to scheduling information of DCI 0 or 1A.

16. The terminal according to claim 13, wherein the processor is further configured to:
determine, according to a set of downlink carriers of the N carriers scheduled by the PDCCH, the number of bits of an uplink ACK/NACK corresponding to downlink data in the set of scheduled downlink carriers, and encode the bits of the uplink ACK/NACK and feed them back to the network device, wherein the set of downlink carriers comprises at least one downlink carrier.

* * * * *